US012737577B2

(12) United States Patent
Ye et al.

(10) Patent No.: US 12,737,577 B2
(45) Date of Patent: Sep. 15, 2026

(54) SYSTEMS AND METHODS FOR TUNING SYMBOL READERS

(71) Applicant: Cognex Corporation, Natick, MA (US)

(72) Inventors: Xiangyun Ye, Framingham, MA (US); Ganesa Rukmani Ramdas Pillai, Natick, MA (US); Hongyi Fan, Franklin, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 18/990,344

(22) Filed: Dec. 20, 2024

(65) Prior Publication Data

US 2025/0209288 A1 Jun. 26, 2025

Related U.S. Application Data

(60) Provisional application No. 63/614,444, filed on Dec. 22, 2023.

(51) Int. Cl.
*G06K 7/14* (2006.01)
*G06K 7/10* (2006.01)

(52) U.S. Cl.
CPC ....... *G06K 7/1417* (2013.01); *G06K 7/10722* (2013.01); *G06K 7/146* (2013.01)

(58) Field of Classification Search
CPC ...... G06K 7/1417; G06K 7/146; G06V 10/25; G06V 10/82; G06V 10/993
USPC ..................................................... 235/462.11
See application file for complete search history.

(56) References Cited

U.S. PATENT DOCUMENTS

2019/0303636 A1 10/2019 Olivastri
2023/0007185 A1* 1/2023 Kuchenbrod ...... G06K 7/10722
2023/0032900 A1 2/2023 Schüler
2023/0367983 A1* 11/2023 Zagaynov ................. G06T 7/60

OTHER PUBLICATIONS

International Search Report and Written Opinion mailed Apr. 16, 2025 for International Application No. PCT/US2024/061380.
[No Author Listed], Information technology—Automatic identification and data capture techniques—Bar code symbol print quality test specification—Two dimensional symbols, ISO/IEC 154152011, IEC, 3, Rue De Varembe, PO Box 131, cH-1211 Geneva 20, Switzerland, Dec. 15, 2011 (Dec. 15, 2011), pp. 1-43, XP082095320.

(Continued)

*Primary Examiner* — Toan C Ly
(74) *Attorney, Agent, or Firm* — Wolf, Greenfield & Sacks, P.C.

(57) ABSTRACT

The techniques described herein relate to methods and systems for processing symbols quickly and robustly. The techniques can include using a pre-trained deep learning model to generate a region of interest (ROI) of an image captured by an imaging device according to a set of attributes associated with the imaging device. The techniques can include using a machine learning model to generate a quality metric for the image. The quality metric can indicate a measurement that the ROI of the symbol can be decoded. The set of attributes of the imaging device can be adjusted based on the quality metric before taking another image until a quality metric satisfies predetermined criteria. Such techniques enable fast and robust symbol processing with compact system configurations and easily setup components.

20 Claims, 13 Drawing Sheets

(56) References Cited

OTHER PUBLICATIONS

Che et al., A Blind Quality Measure for Industrial 2D Matrix Symbols Using Shallow Convolutional Neural Network, 25th IEEE International Conference on Image Processing (ICIP), Athens, Greece, 2018; 2481-2485, doi: 10.1109/ICIP.2018.8451591.

* cited by examiner 100
102
104
106a
106b
125
130

10
14
16
18
22
24
24a
26a
26b
26c
27
28
30
33
Direction of Travel
25

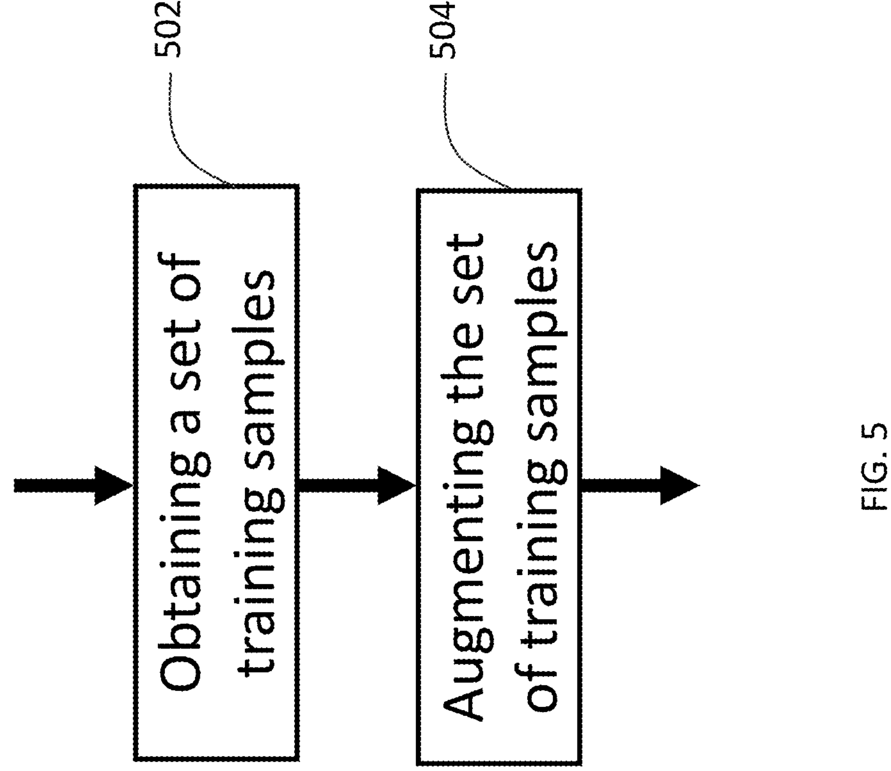
FIG. 5

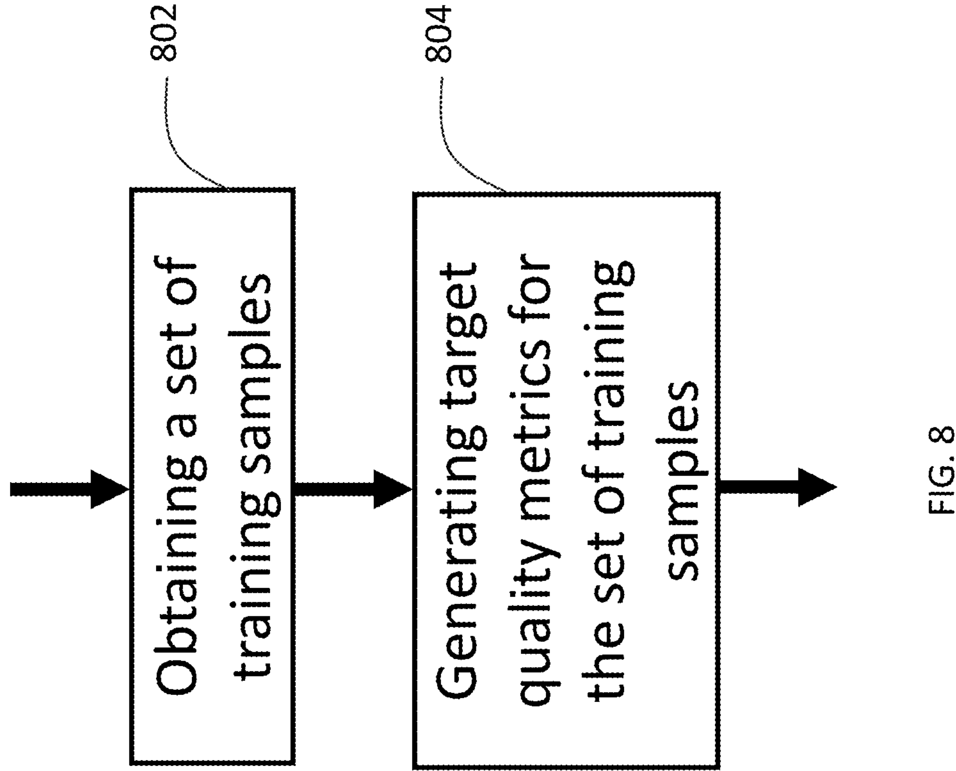
FIG. 8

SYSTEMS AND METHODS FOR TUNING SYMBOL READERS

RELATED APPLICATION

This application claims priority under 35 U.S.C. § 119(e) to U.S. Provisional Application Ser. No. 63/614,444, titled "SYSTEMS AND METHODS FOR TUNING SYMBOL READERS," filed on Dec. 22, 2023, which is herein incorporated by reference in its entirety.

FIELD

The techniques described herein relate generally to imaging systems, including machine vision systems that are configured to identify symbols for objects.

BACKGROUND

Various types of symbols can be used to encode information for various purposes, such as automated part identification. A barcode is a type of symbol that encodes information using a binary spatial pattern that is typically rectangular or square. A one-dimensional barcode encodes the information with one or more spatially contiguous sequences of alternating parallel bars and spaces (e.g., elements) of varying width. For certain types of one-dimensional barcodes (e.g., often called multi-width barcodes), the width of each element is an integer multiple of modules. A two-dimensional barcode typically encodes information as a uniform grid of module elements, each of which can be black or white.

Typically, barcodes are created by printing (e.g., with ink) or marking (e.g., by etching) bar or module elements upon a uniform reflectance substrate (e.g., paper or metal). The bars or dark modules typically have a lower reflectance than the substrate, and therefore appear darker than the spaces between them (e.g., as when a barcode is printed on white paper using black ink). But barcodes can be printed in other manners, such as when a barcode is printed on a black object using white paint. To differentiate a barcode more readily from the background, the symbol is typically placed relatively distant from other printing or visible structures. Such distance creates a space, often referred to as a quiet zone, both prior to the first bar and after the last bar (e.g., in the case of a one-dimensional barcode), or around the grid of module elements (e.g., in the case of a two-dimensional barcode). Alternatively, the spaces and quiet zones can be printed or marked, and the bars are implicitly formed by the substrate.

SUMMARY

Aspects of the present disclosure relate to systems and methods for tuning symbol readers.

Some embodiments relate to a method for processing symbols, the method comprising: receiving, from an imaging device associated with a set of attributes, an image of an object that is at least partially within a field-of-view (FOV) of the imaging device, wherein the imaging device captured the image according to the set of attributes; in response to a presence of a symbol within the image, generating a region of interest (ROI) of the symbol; generating a quality metric for the image, wherein the quality metric indicates a measurement that the ROI of the symbol can be decoded; and adjusting the set of attributes of the imaging device based, at least in part, on the quality metric for the image.

Optionally, the method comprises generating, using a pre-trained deep learning model, a plurality of candidate ROIs; and selecting the ROI of the symbol from the plurality of candidate ROIs.

Optionally, the pre-trained deep learning model was trained with a first set of training samples; and each of the training samples of the set comprises a pair of: an image that contains a symbol; and information about the symbol.

Optionally, the information about the symbol comprises at least one of: a location of the symbol, a boundary of the symbol, pixels that comprise at least part of the symbol, an orientation of the symbol, a size of the symbol, a polarity of the symbol, a type of the symbol, a module size, a print type of the symbol, a print growth or shrinkage of the symbol, or a decodability of the symbol.

Optionally, the first set of training samples comprise a plurality of base training samples and a plurality of augmented training samples generated from the plurality of base training samples.

Optionally, the plurality of augmented training samples are generated from respective base training samples by at least one of: rotating, deforming elastically, flipping, blurring, changing brightness, changing contrast, overlaying random noise, shearing, or inverting polarity.

Optionally, information about the training sample comes from a decode result of the ROI of the symbol and comprises at least one of: a location of the symbol, a boundary of the symbol, pixels that comprise at least part of the symbol, an orientation of the symbol, a size of the symbol, a polarity of the symbol, a type of the symbol, a module size, a print type of the symbol, a print growth or shrinkage, or a decodability of the symbol.

Optionally, generating the quality metric for the image comprises: extracting a plurality of features from at least one of the image or the ROI of the symbol; and generating, using a machine learning model, the quality metric based on the plurality of features.

Optionally, extracting the plurality of features comprises at least one of: extracting a set of global features from the image, extracting a set of regional features from the ROI of the symbol, or extracting a set of decoder features from a decode result of the ROI of the symbol.

Optionally, the set of global features comprises at least one of: a contrast of the image, a mean of the image, a standard deviation of the image, an entropy of the image, a mean of a gradient of the image, a standard deviation of the gradient of the image, a mean of a Laplacian of the image, or a standard deviation of the Laplacian of the image.

Optionally, the set of regional features comprises at least one of: a contrast of the ROI of the symbol, a mean of the ROI of the symbol, a standard deviation of the ROI of the symbol, an entropy of the ROI of the symbol, a mean of a gradient of the ROI of the symbol, a standard deviation of the gradient of the ROI of the symbol, a mean of a Laplacian of the ROI of the symbol, or a standard deviation of the Laplacian of the ROI of the symbol.

Optionally, the set of decoder features comprises at least one of: a module separability, an unused error correction, a background uniformity, a fixed pattern matching, a symbol separability, a print growth or shrinkage, a grid non-uniformity, an axial non-uniformity, or a quiet zone matching.

Optionally, the machine learning model was trained with a second set of training samples and/or features extracted from the second set of training samples, and respective target quality metrics.

Optionally, the second set of training samples comprises images captured from a plurality of scenes in which the symbol is presented within a field-of-view of a camera; for each of the plurality of scenes, respective images are captured by changing attributes of an imaging formation system; and each scene of the plurality of scenes comprises an object and a symbol viewed by the camera from a viewpoint.

Optionally, the second set of training samples comprises images synthesized by simulating the set of attributes of the imaging device on a set of pre-selected images of a plurality of scenes.

Optionally, simulating the set of attributes of the imaging device comprises at least one of: blurring, applying noise, applying gamma correction, or applying image filtering.

Optionally, the attributes of the imaging formation system form a space where each point within the space corresponds to an image captured with respective attributes of a scene of the plurality of scenes.

Optionally, for each scene of the plurality of scenes, the respective target quality metrics of training samples of the scene are generated based on individual relative positions within a space spanned by the attributes of the imaging formation system.

Optionally, the respective target quality metrics of the training samples of the scene are generated by: computing decode results of images of the scene captured by varying the attributes of the imaging formation system; selecting, based at least in part on the decode results, a combination of attributes from the attributes of the imaging formation system; and generating, based at least in part on a distance from a point within the space spanned by the attributes of the imaging formation system that corresponds to the selected combination of attributes, the respective target quality metrics of the training samples of the scene.

Optionally, the selected combination of attributes have a single most desirable point which represents the attribute of the imaging formation system best suited for the scene.

Optionally, the target quality metrics of the training images from different scenes are generated independently.

Optionally, the method comprises receiving a second image of the object from the imaging device captured according to the adjusted set of attributes.

Optionally, the method comprises determining whether the generated quality metric for the image satisfies predetermined criteria before adjusting the set of attributes of the imaging device.

Optionally, the method comprises: when it is determined that the quality metric for the image does not satisfy the predetermined criteria, proceeding with adjusting the set of attributes of the imaging device based, at least in part, on quality metric for the image; and when it is determined that the quality metric for the image satisfies the predetermined criteria, stopping adjusting the set of attributes of the imaging device.

Optionally, the set of attributes comprise at least one of: focus, gain factor, exposure, status of light banks, polarization, image filtering, or high dynamic range (HDR).

Optionally, the symbols comprise at least one of: linear barcode, stacked barcode, postal code, or 2D symbol.

Some embodiments relate to a system comprising at least one processor configured to perform one or more operations described herein.

Optionally, the one or more operations described herein can run in parallel on respective processors of the at least one processor.

Optionally, each of the at least one processor can be a CPU, NPU, GPU, or TPU.

Some embodiments relate to a non-transitory computer readable medium comprising program instructions that, when executed, cause at least one processor to perform one or more operations described herein.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF THE DRAWINGS

The accompanying drawings may not be drawn to scale. In the drawings, each identical or nearly identical component that is illustrated in various figures is represented by a like numeral. For purposes of clarity, not every component may be labeled in every drawing. In the drawings:

FIG. 5 is a flow chart illustrating a method for training a deep learning model of the component of FIG. 4, according to some embodiments.

FIG. 8 is a flow chart illustrating a method for training a machine learning model of the component of FIG. 7, according to some embodiments.

DETAILED DESCRIPTION

Figures 1A, 1B:
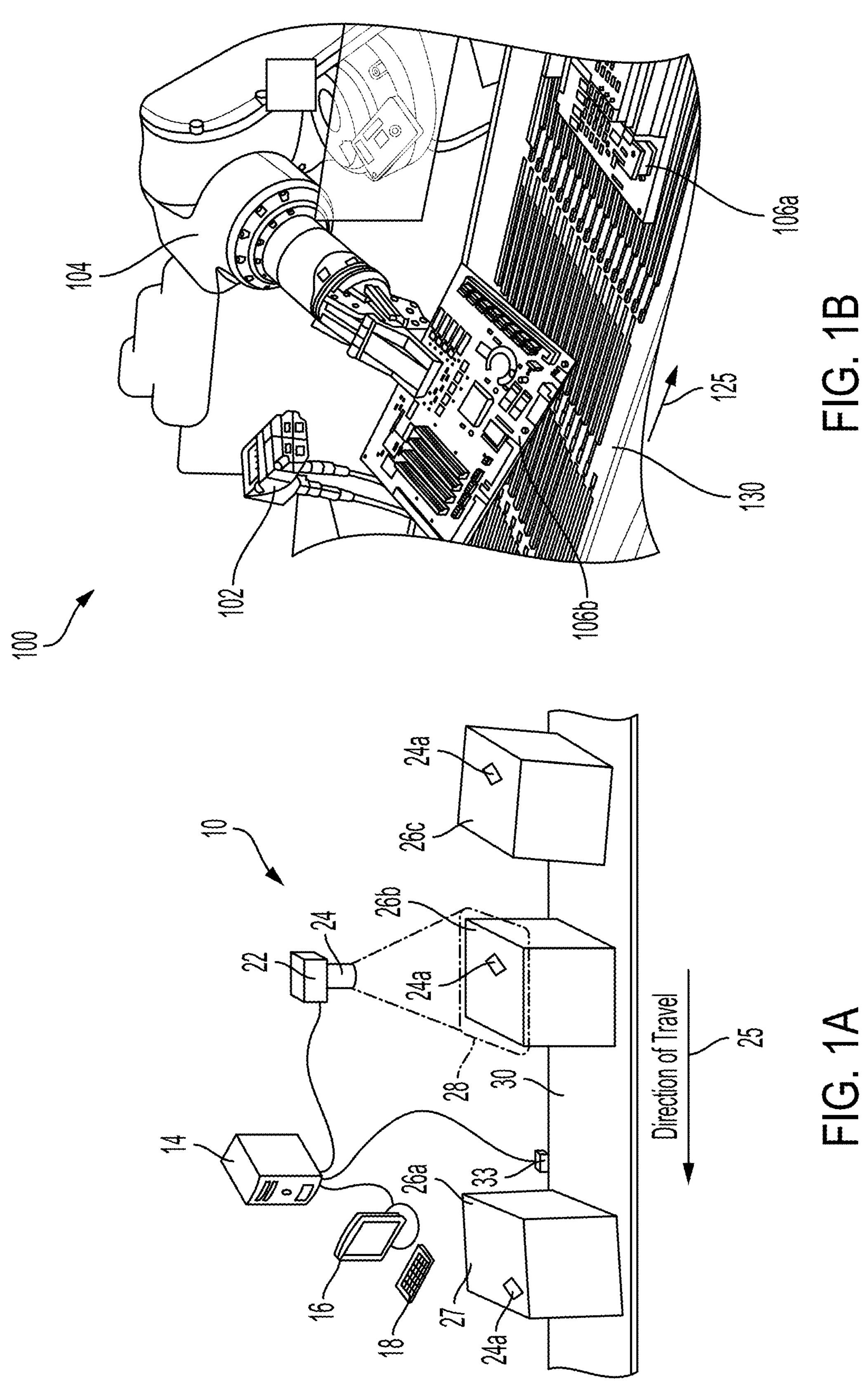
FIG. 1A is a schematic diagram illustrating an exemplary machine vision system, according to some embodiments.
FIG. 1B is a schematic diagram illustrating an exemplary machine vision system, according to some embodiments.

The techniques described herein provide machine vision systems that can process symbols quickly and robustly, including with compact system configurations and provide for easily setting-up system components. Such machine vision systems can be used in various applications including, for example, factory automation applications and/or logistics applications, including in situations where conventional technologies can take long time to process and/or even fail to process symbols.

In some examples, machine vision systems can be configured to process symbols on products moving along production lines, such that appropriate actions (e.g., such as assembly steps) are performed with respect to the products. With the increasing demand of improving production capability, it is desirable to look for ways to increase speed at which factory automation applications can pass products through production lines. However, a busy production line can have limited physical space for a variety of actions that need to be completed, which restrains the configurations of machine vision systems. For example, a machine vision system can have a limited number of sensors, or even a single sensor, which may need to be fixedly mounted and have a medium to short imaging/sensing distance. With such short sensing distances, the sampling rates can be lower than desired due to the short time that the products are within a field-of-view (FOV) of a sensor. Further, since speed is important, sensing results can be poor due to the movements along the production lines. Additionally, the products passing through production lines can have symbols printed on labels, and/or symbols directly marked on materials of the products (e.g., metal, plastic, and other durable materials, which can be harder to mark than printing on labels). The direct-mark symbols therefore can have poorer quality than the symbols printed on labels, which makes more challenging to process the direct-mark symbols.

To reach desired performance, the sensors can be tuned before deploying the reader. In some embodiments, the sensors can be tuned with images captured at a static scene having an object by changing the attributes of an imaging formation system associated with the images. The attributes of the imaging formation system can include, for example, exposure, focus, gain, gamma, image filtering, high dynamic range (HDR). The tuned sensors can provide desired images for the decoder despite the constraints of individual application scenes including, for example, movements, illumination condition.

The techniques described herein can use a pre-trained deep learning model configured to narrow down at least one region of interest (ROI) of a symbol in an image captured by an imaging device associated with a set of device attributes (e.g., gain, exposure, focus, etc.). The techniques described herein can also use a machine learning model to generate a quality metric for the image and the corresponding ROI/ROIs. The quality metric can be an average or a median of the quality metrics of multiple ROIs. The set of attributes of the imaging device can be adjusted based on the quality metric before taking another image until the quality metric satisfies predetermined criteria. Such techniques enable fast and robust tuning of machine vision systems according to environments which can include, for example, the types of symbols on products, the speed of movements of the products, the distance between the sensor and the products, lighting conditions, etc. The symbols can include at least one of: 1D symbol, stacked symbol, postal symbol, or 2D symbol (see, e.g., FIGS. 2A-2B). The machine vision systems can provide, with the imaging device associated with the tuned set of attributes, accurate and consistent decoding results for a series of similar products that pass through the systems.

In some embodiments, the techniques can include localization of an ROI of the symbol in an image. The techniques can include generating, using a pre-trained deep learning model, a plurality of candidate ROIs, and locating the ROI of the symbol based on the plurality of candidate ROIs from the image. For example, the pre-trained deep learning model may generate multiple candidate ROIs in an image. At least some of the candidate ROIs can overlap with each other. The ROI of the symbol can be determined by a post-processing module configured to remove overlapping areas between the candidate ROIs and/or locate unique objects present in the image.

The deep learning model configured for generating the candidate ROIs can be pre-trained with a set of training samples, each of which can comprise a symbol and ground truth information about the symbol (e.g., a location of the symbol, a boundary of the symbol, pixels that comprise at least part of the symbol, an orientation of the symbol, a size of the symbol, a polarity of the symbol, a type of the symbol, a module size, a print type of the symbol, a print growth or shrinkage, or a decodability of the symbol). The set of training samples can be generated by including a plurality of base training samples and a plurality of augmented training samples generated by modulating the plurality of base training samples to model images that would be captured in field. Such modulations can include, but are not limited to, rotating, flipping, blurring, changing brightness, changing contrast, changing noise, and/or inverting polarity of respective base training samples and symbol information.

A quality metric for the image can be generated and used to guide the tuning of the machine vision system. The quality metric can indicate a measurement that the ROI of the symbol can be decoded (e.g., a decoded string, a sharpness, a contrast, a quality, a readability, an unused error correction, a time to decode, or a decode success). The quality metric for the image can be generated by, for example, a machine learning model based on features extracted from the image and/or the ROI of the symbol. The features can include, but are not limited to, a set of global features from the image, a set of regional features from the ROI of the symbol, and/or a set of decoder features from a decode result of the ROI of the symbol. The set of global features can include, but are not limited to, a contrast of the image, a brightness of the image, a mean of the image, a standard deviation of the image, an entropy of the image, a mean of a gradient of the image, a standard deviation of the gradient of the image, a mean of a Laplacian of the image, and/or a standard deviation of the Laplacian of the image. The set of regional features can include, but are not limited to, a contrast of the ROI of the symbol, a brightness of the ROI of the symbol, a mean of the ROI of the symbol, a standard deviation of the ROI of the symbol, an entropy of the ROI of the symbol, a mean of a gradient of the ROI of the symbol, a standard deviation of the gradient of the ROI of the symbol, a mean of a Laplacian of the ROI of the symbol, and/or a standard deviation of the Laplacian of the ROI of the symbol. The set of decoder features can include, but are not limited to, a module separability, an unused error correction, a background uniformity, a fixed pattern matching, a symbol separability, a print growth, a grid non-uniformity, an axial non-uniformity, and/or a quiet zone matching.

The machine learning model configured for generating the quality metric can be pre-trained with a set of training samples and/or features extracted from the set of training samples, the decoding results of the training sample, and respective target quality metrics. The set of training samples can include images captured by sensors and/or images generated by simulating the set of attributes of the imaging device (e.g., blurring, noise, gamma correction, or transformation) on the images captured by the sensors. Target quality metrics for the set of training samples can be generated based on an imaging formation system and the decodability of the set of training samples. In some examples, an area in the space spanned by the attributes of an imaging formation system (e.g., exposure, focus, gain) corresponding to an image that provides a desired decode result can be selected as the area having the highest target quality metric. The respective target quality metrics can be generated based on distances from the selected area in the space spanned by the attributes. For example, the respective target quality metrics can decrease when corresponding distances from the selected area increase.

The techniques can include adjusting the set of attributes associated with the imaging device based on the quality metric iteratively until the quality metric satisfies predetermined criteria. The set of attributes can include focus, gain factor, exposure, status of light banks, polarization, etc. After a quality metric for a corresponding image and/or a ROI of the symbol is generated, it can be determined whether the quality metric satisfies the predetermined criteria. When it is determined that the quality metric does not satisfy the predetermined criteria, the set of attributes of the imaging device can be adjusted based on the quality metric; and when it is determined that the quality metric satisfies the predetermined criteria, the set of attributes of the image device can be set for capturing images of the following objects which can be similar to the object used for tuning the sensors.

The forementioned techniques enable using machine learning techniques (including to find the ROI as well as to evaluate the quality of the images) in order to accurately determine device attribute settings that capture sufficiently bright and focused images of symbols in order to provide for proper symbol decoding. The machine learning techniques can be used to determine the appropriate device attribute settings that will work on a sequence of images over time such that even with some changes in conditions (e.g., lighting conditions and viewpoint changes etc.), the device attribute settings can still be sufficient to capture decodable images.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Referring to FIG. 1A, aspects of the techniques discussed herein will be described in the context of an exemplary machine vision system 10 wherein a transfer line 30 moves objects 26*a*, 26*b*, 26*c*, etc., along a direction of travel 25. A person of ordinary skill would understand that the machine vision system 10 is an exemplary fixed-mount application and that the disclosed systems and methods for processing symbols on objects are applicable in other applications, including hand-held applications.

In the present example, each of the objects has similar physical characteristics and therefore, only one object, for example, object 26*a*, will be described in detail. Specifically, object 26*a* includes a surface 27 which faces generally upward as object 26*a* is moved by transfer line 30. A symbol 24*a* is applied to the surface 27 for identification purposes. The symbol 24*a* can be printed on a label attached to the surface 27, or directly marked on the surface 27. Similar-type symbols 24*a* are applied to surfaces of each of objects 26*b* and 26*c*. Although the illustrated example shows the surface 27 as a top surface of a cubic object, it should be appreciated that a symbol can be on any surface of an object with any shape.

The machine vision system 10 includes a sensor 22 including optics 24 that define a field of view (FOV) 28 below the sensor 22 through which transfer line 30 moves the objects 26*a*, 26*b*, 26*c*, etc. Thus, as the objects move along direction of travel 25, each of the surfaces 27 comes into field of view 28. Field of view 28 can be large enough such that the surface 27 is at least partially located at one point or another within the field of view 28 such that any code applied to the surface 27 of an object passes through the field of view 28 and can be captured in an image by sensor 22. As the objects move along the direction of travel 25, the sensor 22 can capture partial fragments of the symbol 24*a* applied to the surface 27. As the sensor 22 may need to be fixedly mounted and have a medium to short imaging/sensing distance, the sampling rates can be lower than desired due to the short time that the products are within the FOV of the sensor 22.

The machine vision system 10 also includes a computer or processor 14 (or multiple processors) which receives images from sensor 22, examines the images to identify sub-portions of the images that may include an instance of a symbol as symbol candidates and then attempts to decode each symbol candidate in an effort to identify the object currently within the field of view 28. To this end, sensor 22 is linked to processor 14. An interface device 16/18 can also be linked to processor 14 to provide visual and audio output to a system user as well as for the user to provide input to control the machine vision system 10, set system operating parameters, trouble shoot system problems, etc. A person of skill in the art will appreciate that while the sensor 22 is shown separate from the processor 14, the processor 14 can be incorporated into the sensor 22, and/or certain processing can be distributed between the sensor 22 and the processor 14. In at least some embodiments, the machine vision system 10 also includes a tachometer (encoder) 33 positioned adjacent transfer line 30 which may be used to identify direction of travel 25 and/or the speed at which transfer line 30 transfers objects through the field of view.

Figure 2B:
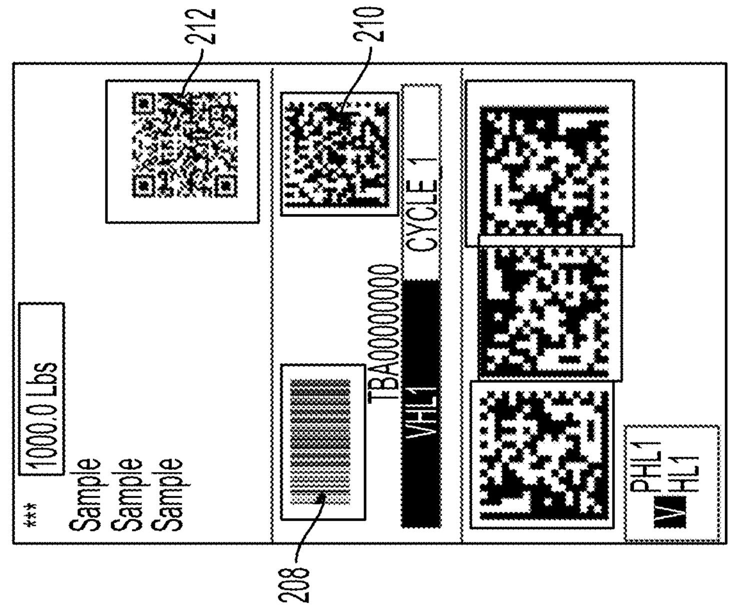
FIG. 2B is an exemplary printed label with various types of barcodes.
Figure 2A:
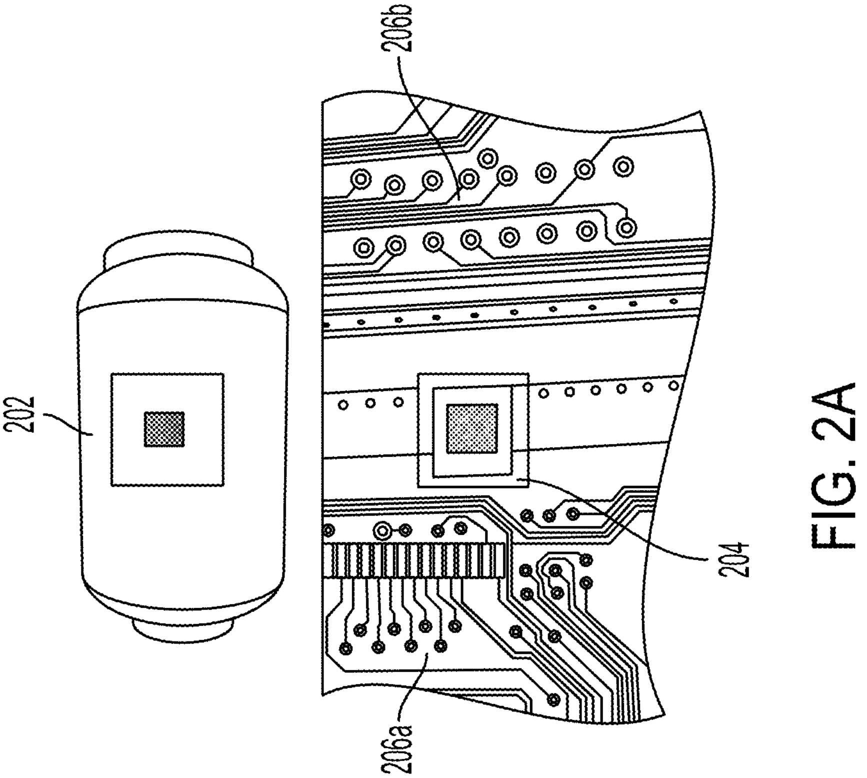
FIG. 2A are images illustrating two-dimensional (2D) barcodes marked on objects.

In some embodiments, the sensor 22 and processor 14 are Cognex industrial, image-based barcode readers that scan and read various symbols, such as 1D symbol, stacked symbol, postal symbol, and 2D symbol (see, e.g., FIGS. 2A-2B). In some embodiments, the techniques discussed herein are at least partially executed on a system embedded in the sensor 22, which includes dedicated memory and computational resources to perform the image processing (e.g., to perform the machine vision techniques discussed herein). In some examples, a single package houses a sensor (e.g., an imaging device) and at least one processor (e.g., a programmable processor, a field programmable gate array (FPGA), a digital signal processor (DSP), an ARM processor, and/or the like) configured to perform image processing.

As another example, FIG. 1B shows an exemplary machine vision system 100 wherein a transfer line 130 moves objects 106*a*, 106*b*, etc., along a direction of travel 125. As illustrated in FIG. 1B, the objects can be compact, integrated electronic components that have symbols directly marked thereon at limited locations so as not to interrupt the functions of the electronic component. The machine vision system 100 can include a symbol reader 102 configured to read various symbols on the objects. The symbol reader 102 can include sensor (e.g., sensor 22) and processor (e.g., processor 14), which can be fully integrated, partially integrated, or discrete components as the present disclosure may not be limited in these aspects. The symbol reader 102 can communicate the decode results to other components along the transfer line 130 such as the robotic arm 104 such that appropriate actions can be performed with respect to the products according to the decode results of the symbols. For example, a symbol can be on a side surface of the object 106*b*. According to the information in the decode results of that symbol, the robotic arm 104 can place the side surface at a direction perpendicular to the direction of travel 125 such that the object 106*b* is similarly positioned as the object 106*a* and ready for the next action (e.g., inserting cards into the sockets on the object 106*b*).

Similar to the machine vision system 10, the machine vision system 100 can include a computer or processor (or multiple processors) which receives images from symbol reader 102, examines the images to identify sub-portions of the images that may include an instance of a symbol as symbol candidates and then attempts to decode each symbol candidate in an effort to identify the object currently within the field of view. A person of skill in the art will appreciate that while symbol reader 102 can be linked to the computer or processor (or multiple processors) via an interface device or be integrated with the computer or processor (or multiple processors).

FIG. 2A shows a 2D barcode 202 directly marked on a curved surface of an object; and a 2D barcode 204 directly marked on a printed circuit board between two circuit areas 206*a* and 206*b*. Due to various reasons such as hard surface material, poor surface flatness, and/or limited surface area, the direct-mark symbols can have poorer quality than the symbols printed on labels, which makes more challenging to process the direct-mark symbols. FIG. 2B shows an exemplary print label, which may be used in logistic application, with 1D code 208, DataMatrix 210, and QR code 212 printed thereon.

Figure 3:
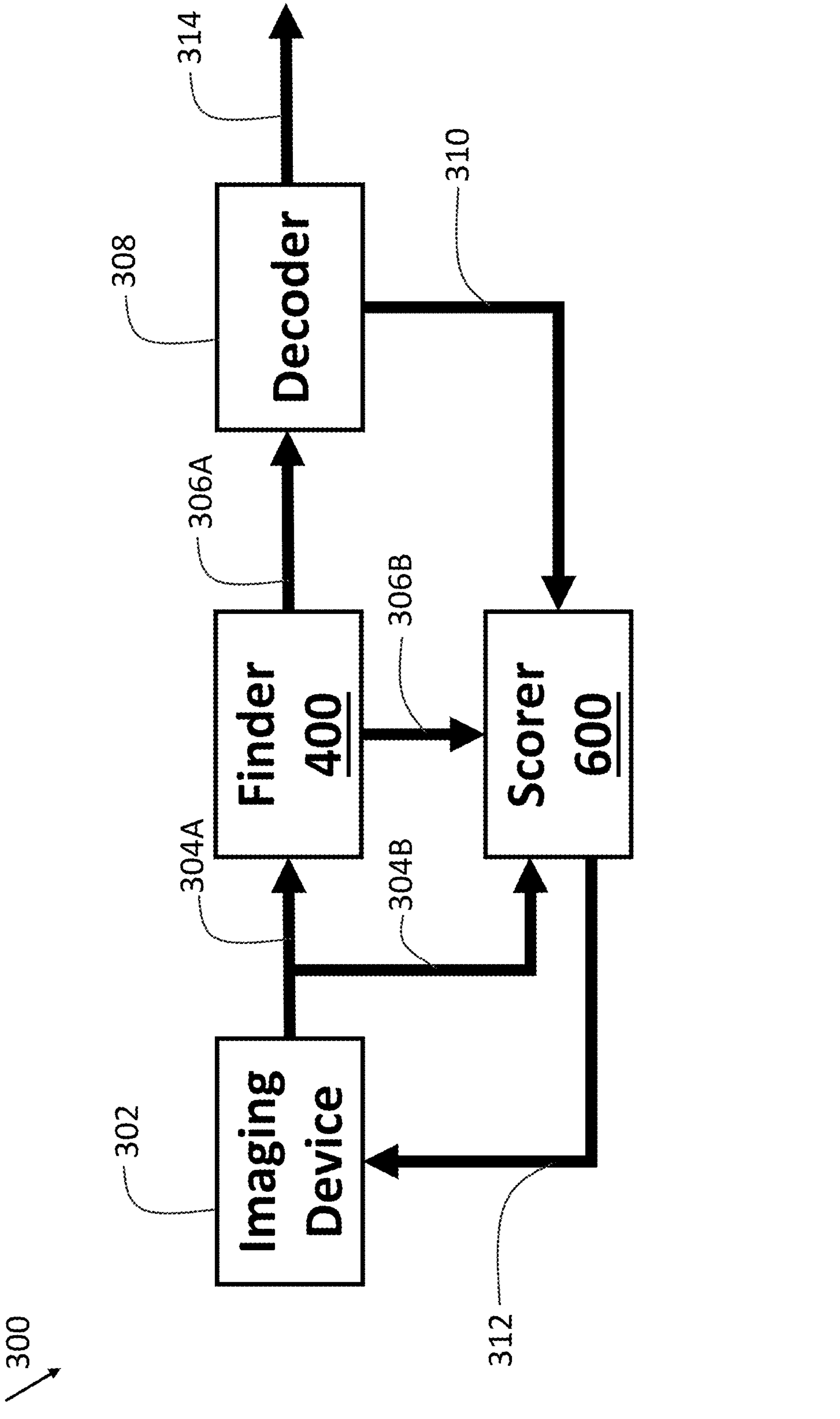
FIG. 3 is a block diagram illustrating an exemplary system configured to read a symbol on an object, according to some embodiments.

FIG. 3 shows an exemplary system 300 configured to read symbols on objects. The system 300 can include an imaging device 302 associated with a set of attributes (e.g., gain, exposure, focus, etc.) and configured to capture images according to the set of attributes. A finder 400 can quickly locate one or more regions of interest (ROIs) in the images, based on received information 304A about the images captured by the imaging device 302, by using a pre-trained deep learning model configured to narrow down candidates for the ROIs. A decoder 308 can generate decode results for the ROIs of the images based on received information 306A about the located ROIs in the images.

A scorer 600 can generate quality metrics 312 based on information 304B about the images captured by the imaging device 302, information 306B about the located ROIs in the images from the finder 400, and/or information 310 about the decode results for the ROIs of the images from the decoder 308. The quality metrics 312 can indicate measurements that the ROIs of the images can be decoded. In some embodiments, each quality metric 312 can be a single scalar metric that measures the quality of an image visually and/or from the perspective of the decoder.

The set of attributes associated with the imaging device 302 can be tuned based on the quality metric 312 generated by the scorer 600. The tuning process can be iterative such that the set of attributes of the imaging device 302 can be adjusted based on the quality metric before taking another image. The tuning process may continue until the quality metric 312 satisfies predetermined criteria (e.g., above a threshold), at which point the decoder 308 can provide the final decode results 314 to, for example, another component for further processing. Such techniques enable fast tuning of the system 300 according to environments which can include, for example, the types of symbols on products, the speed of movements of the products, the distance between the sensor and the products, lighting conditions, etc. The system 300 can provide, with the imaging device 302 associated with the tuned set of attributes, accurate and consistent decoding results for a series of similar products that pass through the systems.

Figure 4:
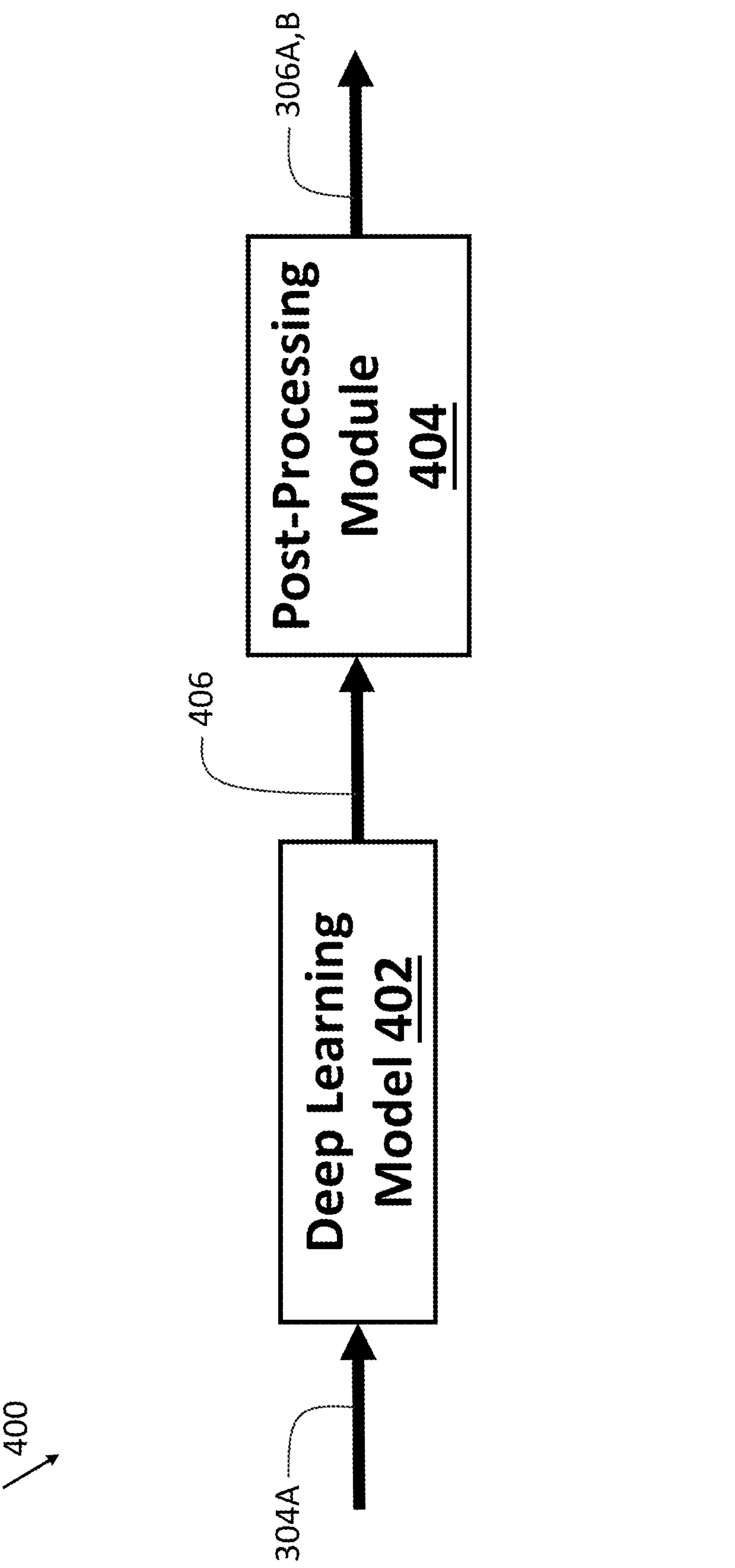
FIG. 4 is a block diagram illustrating a component of the system of FIG. 3, which is configured for locating a symbol in an image, according to some embodiments.

FIG. 4 shows the finder 400 configured to locate one or more ROIs of an image. Each ROI may correspond to a symbol on an object captured by the image. As illustrated, the finder 400 can include a deep learning model 402 configured to generate candidate ROIs. The deep learning model 402 can be pre-trained as further described herein with respect to FIGS. 5-6B, such that the deep learning model 402 can quickly generate candidate ROIs. The finder 400 can include a post-processing module 404 configured to locate one or more ROIs. For example, the pre-trained deep learning model 402 can generate multiple candidate ROIs (e.g., more than 2,500) in an image. At least some of the candidate ROIs can overlap with each other. The post-processing module 404 can remove overlapping areas between the candidate ROIs and/or locating unique objects present in the image in order to determine the ROIs. Such a configuration enables the finder 400 to quickly and accurately locate ROIs in images by using a pre-trained deep learning model. Such a configuration can also be used to complement any suitable conventional rule-based approach to reduce reading time.

Figures 6A, 6B, 6C, 6D, 6E:
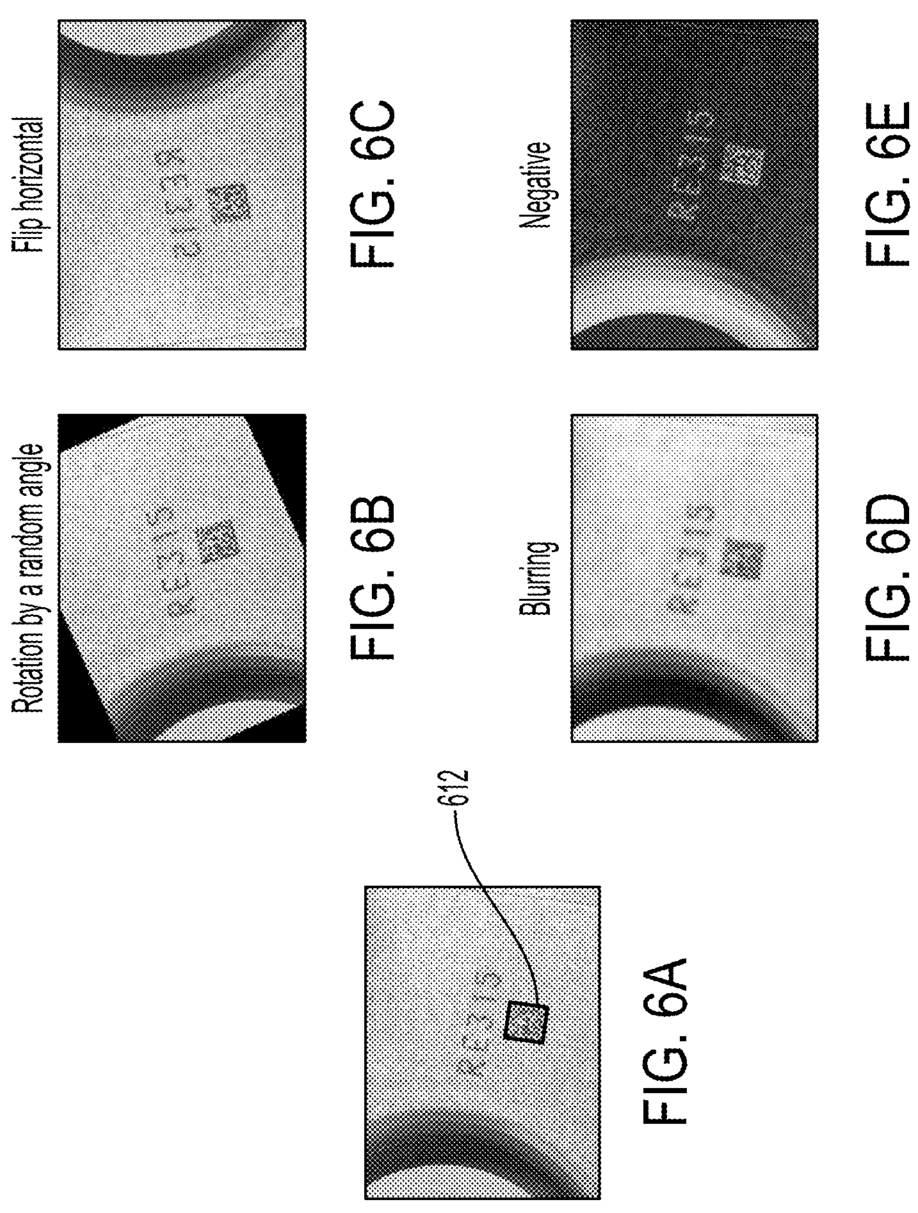
FIG. 6A is an exemplary base training sample, which can belong to a set of training samples.
FIGS. 6B-6E are exemplary augmented training samples that are generated from the base training sample of FIG. 6A in order to augment the set of training samples.

FIG. 5 is a flow chart illustrating a method 500 for training the deep learning model 402. The method 500 can start with step 502 to obtain a set of training samples, which can include base training samples such as an image shown in FIG. 6A. A training sample can include a bounding box 612 and corners of the bounding box 612. The base images can be captured by imaging devices. At step 504, the obtained set of training samples can be augmented/modulated so as to generate a larger set of training samples. The modulations can include, for example, rotating, deforming elastically, flipping, blurring, changing brightness, changing contrast, overlaying random noise, shearing, inverting polarity of respective base training samples, etc. As non-limiting examples, FIG. 6B shows a training sample generated by rotating the base image of FIG. 6A; FIG. 6C shows a training sample generated by horizontally flipping the base image of FIG. 6A; FIG. 6D shows a training sample generated by blurring the base image of FIG. 6A; and FIG. 6E shows a training sample generated by inverting polarity of the base image of FIG. 6A.

To train the deep learning model for generating candidate ROIs, each training sample can comprise a symbol and ground truth information about the symbol. The ground truth information about the symbol can include, but is not limited to, a location of the symbol, a boundary of the symbol, pixels that comprise at least part of the symbol, an orientation of the symbol, a size of the symbol, a polarity of the symbol, a type of the symbol, a module size, a print type of the symbol, and/or a decodability of the symbol.

Figure 7:
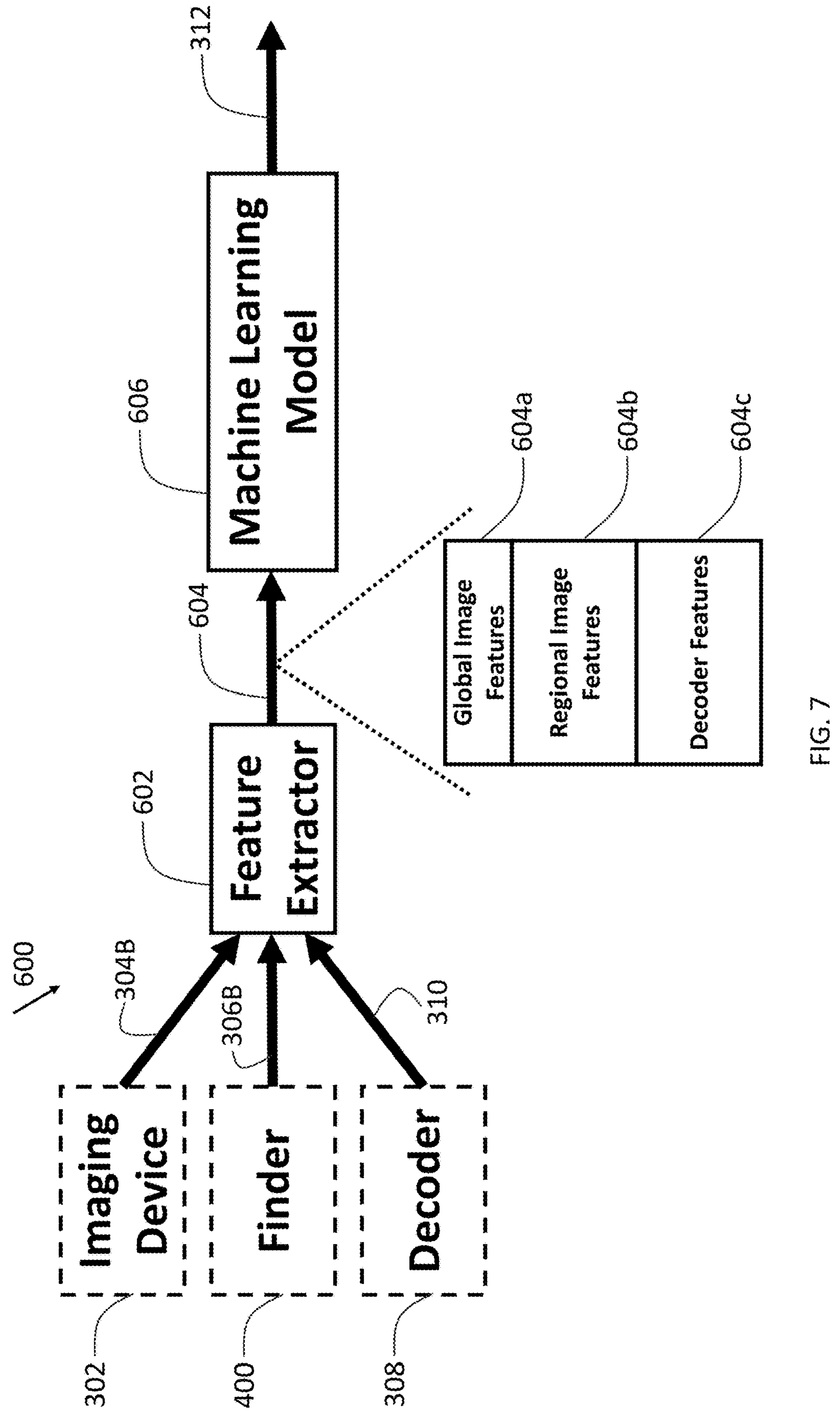
FIG. 7 is a block diagram illustrating a component of the system of FIG. 3, which is configured for generating a quality metric for an image, according to some embodiments.

FIG. 7 shows the scorer 600 configured for generating a quality metric for an image. The quality metric can indicate a measurement that the ROI of the symbol can be decoded. In some embodiments, the quality metric can be a single scalar metric that measures the quality of an image visually and/or from the perspective of the decoder. As illustrated, the scorer 600 can include a feature extractor 602 configured to extract features from the image and/or ROI of the symbol. The features can include a set of global features 604*a* from the image, a set of regional features 604*b* from the ROI of the symbol, and/or a set of decoder features 604*c* from a decode result of the ROI of the symbol.

The set of global features 604*a* can be extracted from information 304B about the images captured by the imaging device 302. The set of global features 604*a* can include, but are not limited to, a contrast of the image, a brightness of the image, a mean of the image, a standard deviation of the image, an entropy of the image, a mean of a gradient of the image, a standard deviation of the gradient of the image, a mean of a Laplacian of the image, and/or a standard deviation of the Laplacian of the image.

The set of regional features 604*b* can be extracted from information 306B about the located ROIs in the images provided by the finder 400. The set of regional features 604*b* can include, but are not limited to, a contrast of the ROI of the symbol, a brightness of the ROI of the symbol, a mean of the ROI of the symbol, a standard deviation of the ROI of the symbol, an entropy of the ROI of the symbol, a mean of a gradient of the ROI of the symbol, a standard deviation of the gradient of the ROI of the symbol, a mean of a Laplacian of the ROI of the symbol, and/or a standard deviation of the Laplacian of the ROI of the symbol.

The set of decoder features 604*c* can be extracted from information 310 about the decode results for the ROIs of the images provided by the decoder 308. The set of decoder features 604*c* can include, but are not limited to, a module separability, an unused error correction, a background uniformity, a fixed pattern matching, a symbol separability, a print growth, a grid non-uniformity, an axial non-uniformity, and/or a quiet zone matching. Module separability may refer to the bi-modality between modules that represent binary data bit 1 and 0 (e.g., light module, dark module). The bi-modality between the modules may be measured by, for example, a separation between a dark peak and a light peak of the modules on a histogram. Symbol separability may refer to the distinctiveness of the symbols, which may be measured by a difference between the mean of an entire image and the mean of the module that represents binary data bit 1 and/or the mean of the module that represents data bit 0. Background uniformity may be measured by the standard deviation of the background modules on which a symbol is attached (e.g., corresponding background modules that form portions of the curved surface of the object, corresponding background modules that form portions of the surface of the printed circuit board in FIG. 2A).

The scorer 600 can include a machine learning model 606 configured to infer the quality metric 312 based on the features 604 from the feature extractor 602. In some examples, the features 604 can include any combination of N number of global features, N number of regional features, and M number of decoder features. The machine learning model 606 can infer a signal scalar metric based on the received combination. The machine learning model 606 can include any suitable models such as linear regression, random forest, support vector machine, neural network, etc.

The machine learning model 606 configured for generating the quality metric can be pre-trained with a set of training samples and/or features extracted from the set of training samples, and respective target quality metrics. FIG. 8 shows a method 800 for training the machine learning model 606. The method 800 can start with step 802 to obtain a set of training samples. The set of training samples can include images captured by sensors and/or images generated by simulating the set of attributes of the imaging device (e.g., blurring, overlaying random noise, gamma correction, or transformation) on the images captured by the sensors. At step 804, target quality metrics for the set of training samples can be generated based on an imaging formation system and the decodability of the set of training samples.

In some examples, based on decode results of the set of training samples, an area in an imaging formation system can be selected. For example, the imaging formation system can include imaging attributes such as focus, exposure, etc. A corresponding area in the space spanned by the attributes of an imaging formation system for an image that provides the best decode result can be selected as the area having the highest target quality metric. The respective target quality metrics can be generated based on distances from the selected area in the imaging formation system. For example, the respective target quality metrics can decrease when corresponding distances from the selected area increase.

Figure 9:
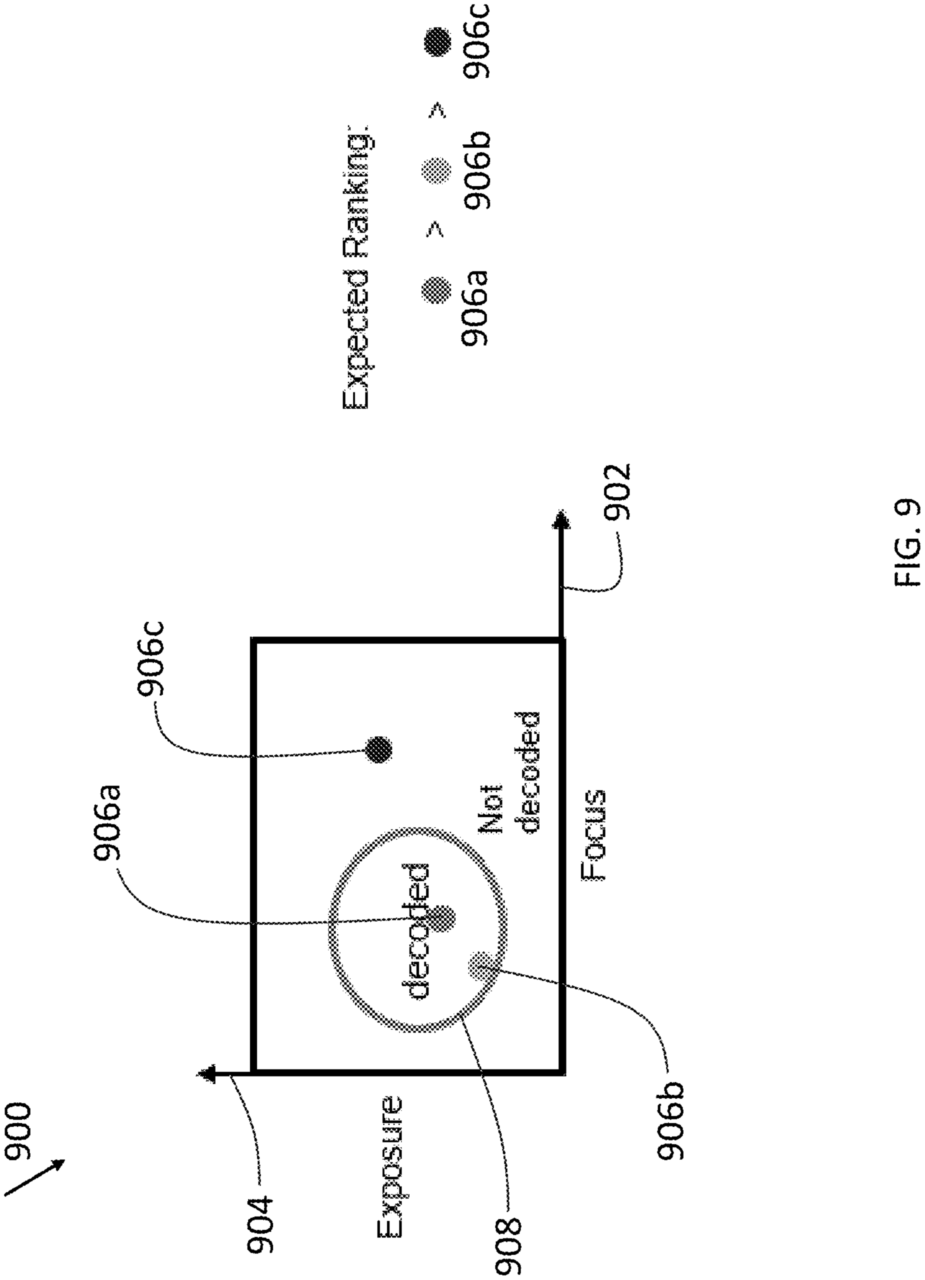
FIG. 9 is a schematic diagram illustrating an imaging formation system configured for training the machine learning model of FIG. 8, according to some embodiments.

FIG. 9 shows an exemplary imaging formation system 900 configured for training the machine learning model 606. As illustrated, the imaging formation system 900 includes a 2D graph having a first imaging attribute 902—focus—as an x-axis and a second imaging attribute 904—exposure—as a y-axis. Assuming images that have the first and second imaging attributes set within the circled area 908 can be decoded, the image having first and second imaging attributes in the center area of the decodable area 908 (e.g., image corresponding to point 906*a* in the 2D graph) can be the most robust image for the decoder and therefore has the highest target quality metric. The image having first and second imaging attributes closer to the edge of the decodable area 908 (e.g., image corresponding to point 906*b* in the 2D graph) has a target quality metric lower than that of the image corresponding to point 906*a* in the 2D graph. The image having first and second imaging attributes outside the decodable area 908 (e.g., image corresponding to point 906*c* in the 2D graph) has a target quality metric lower than that of the image corresponding to point 906*b* in the 2D graph.

Figure 10:
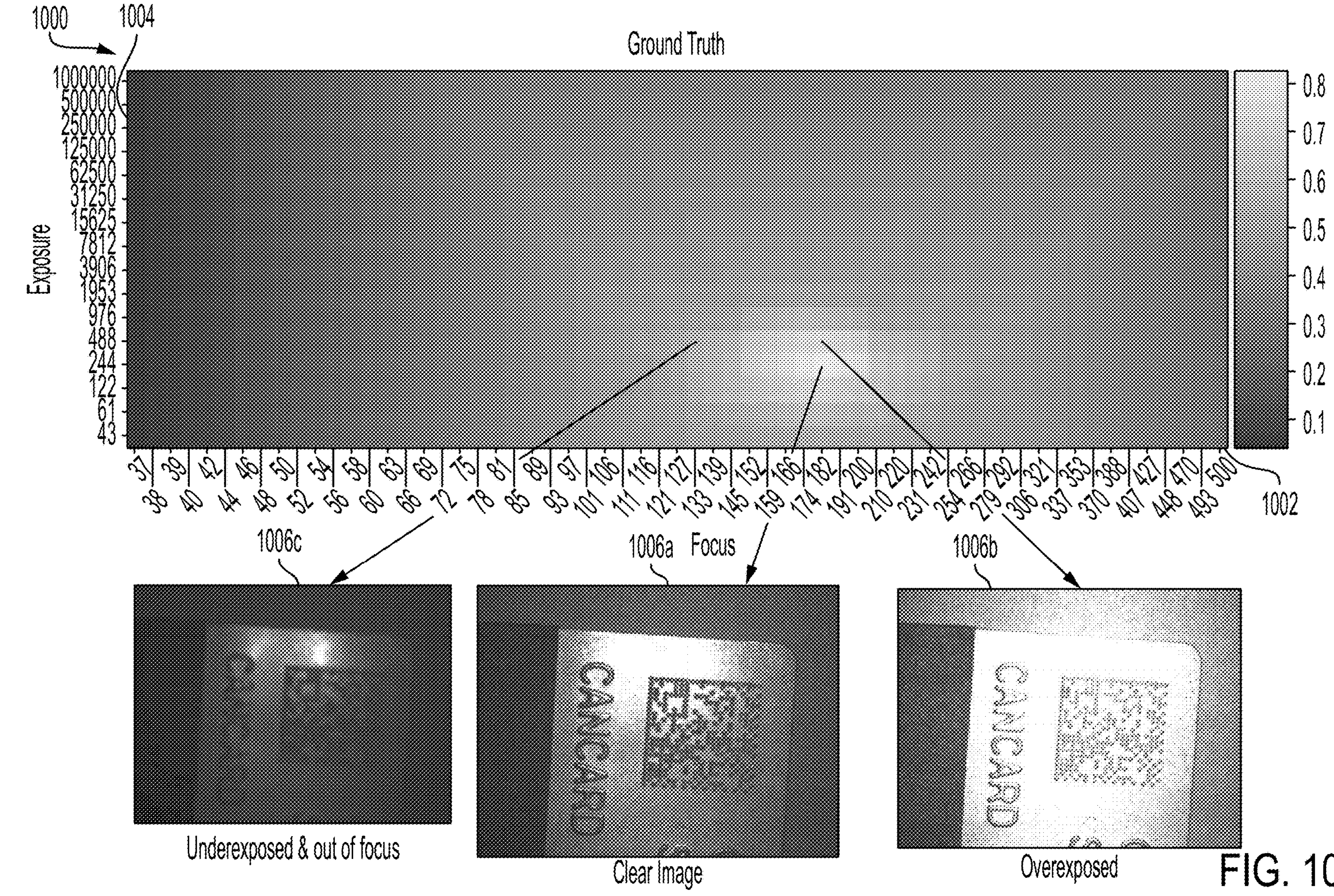
FIG. 10 is a schematic diagram illustrating an imaging formation system configured for training the machine learning model of FIG. 8, according to some embodiments.

FIG. 10 shows another exemplary imaging formation system 1000 configured for training the machine learning model 606. As illustrated, the imaging formation system 1000 includes a 2D graph having a first imaging attribute 1002—focus—as an x-axis and a second imaging attribute 1004—exposure—as a y-axis. In this example, image 1006*a* is the most robust image for the decode and therefore has the highest target quality metric (e.g., 1). The target quality metrics for other images (e.g., image 1006*b* and image 1006*c*) can be generated based on the distances of their corresponding positions in the 2D graph to the image 1006*a*'s corresponding position in the 2D graph. In this example, image 1006*b* has a corresponding position in the 2D graph closer to the image 1006*a*'s corresponding position in the 2D graph than the image 1006*c*'s corresponding position in the 2D graph. Thus, image 1006*b* has a target quality metric higher than that of image 1006*c*.

It should be appreciated that although exemplary imaging formation systems 900 and 1000 have 2D graphs of two imaging attributes, an imaging formation system can have one or more imaging attributes. Although focus and exposure are illustrated as imaging attributes for imaging formation systems 900 and 1000, an imaging formation system can include alternative or additional imaging attributes such as gain factor, status of light banks, polarization, etc. Although a quality metric is illustrated in the exemplary imaging formation system 1000 as having a value between 0-1, a quality metric can have any suitable range of values.

Figure 11:
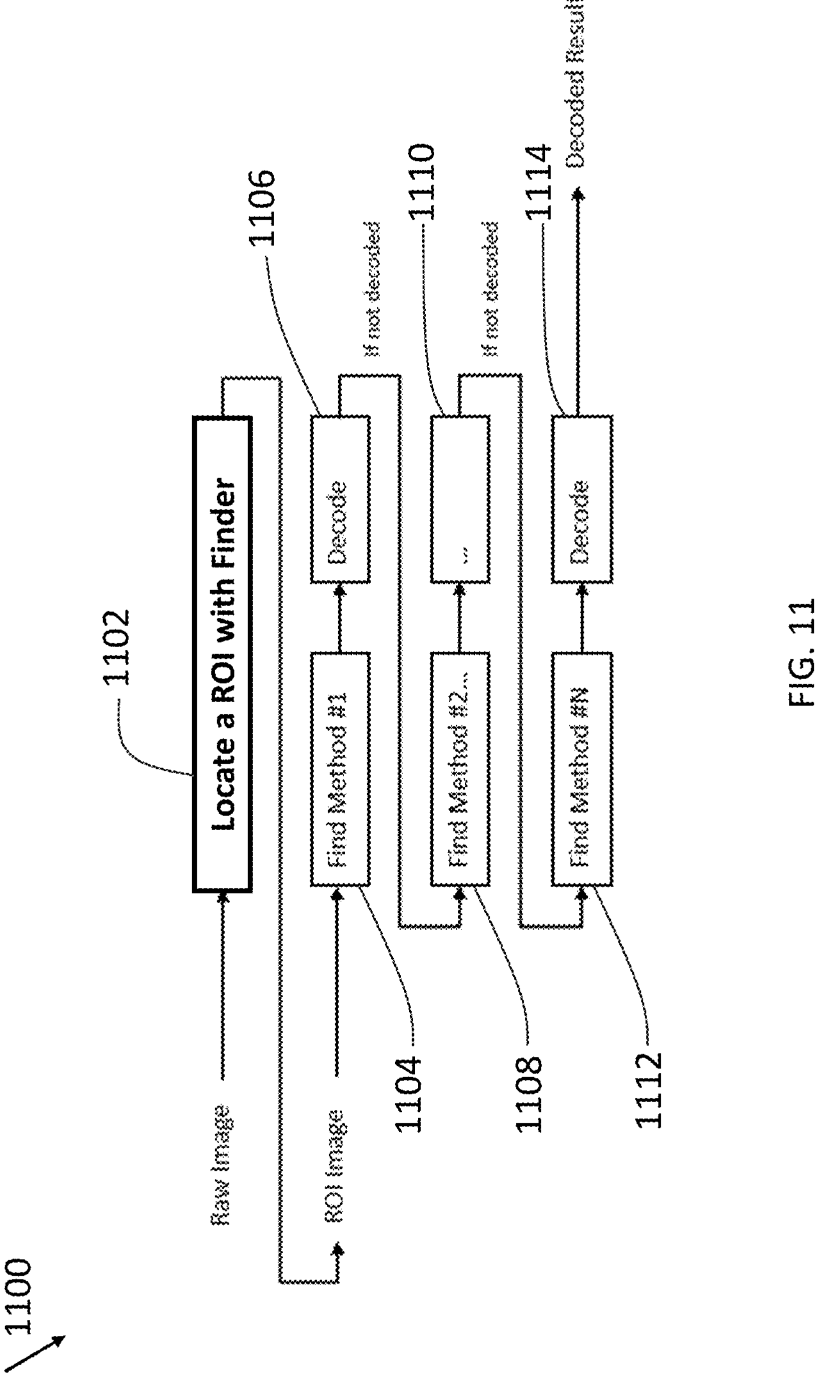
FIG. 11 is a flow chart illustrating a first method for processing a symbol, according to some embodiments.

In some embodiments, machine vision techniques described herein can be used with rule-based approaches. FIG. 11 shows such a method 1100 for processing a symbol. The method 1100 can start with step 1102 to locate a ROI with finder 400. At step 1104, a first rule-based finding method can be applied to the ROI located by finder 400 to locate a symbol. At step 1106, a decoder can attempt to decode the symbol. If the symbol is not decoded, the method 1100 can proceed to step 1108 where a second rule-based finding method can be applied to the ROI located by finder 400 to locate a symbol. Such process can be iterative and do not stop until a symbol located by applying an Nth method to the ROI located by finder 400 can be successfully decoded (steps 1112 and 1114).

Figure 12:
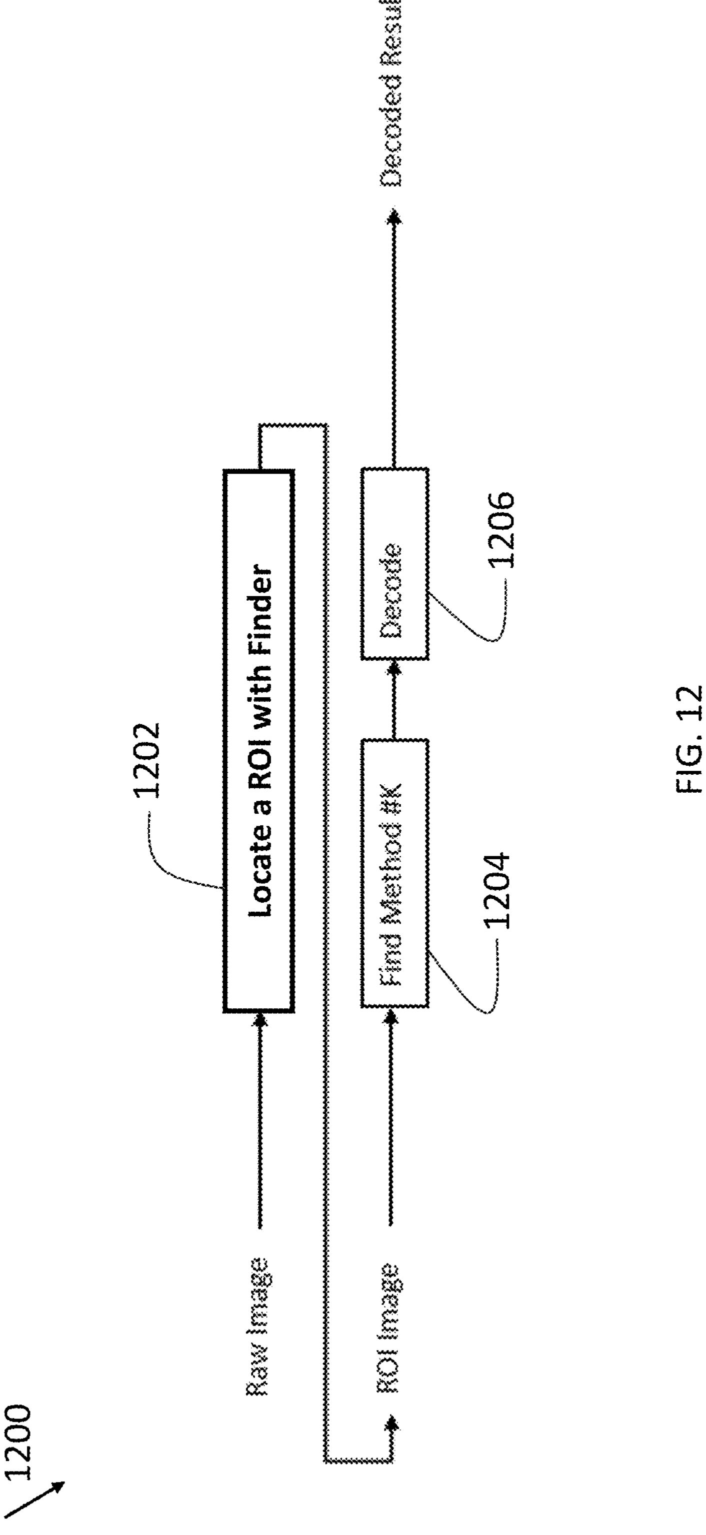
FIG. 12 is a flow chart illustrating a second method for processing a symbol, according to some embodiments.

FIG. 12 shows a method 1200 for processing a symbol. Similar to the method 1100, the method 1200 can start with step 1202 to locate a ROI with finder 400. Different from the method 1100, at step 1204, the method 1200 can apply to the ROI located by finder 400 a Kth rule-based finding method, which can be selected based on information such as the environment in which the method 1200 operates.

Figure 13:
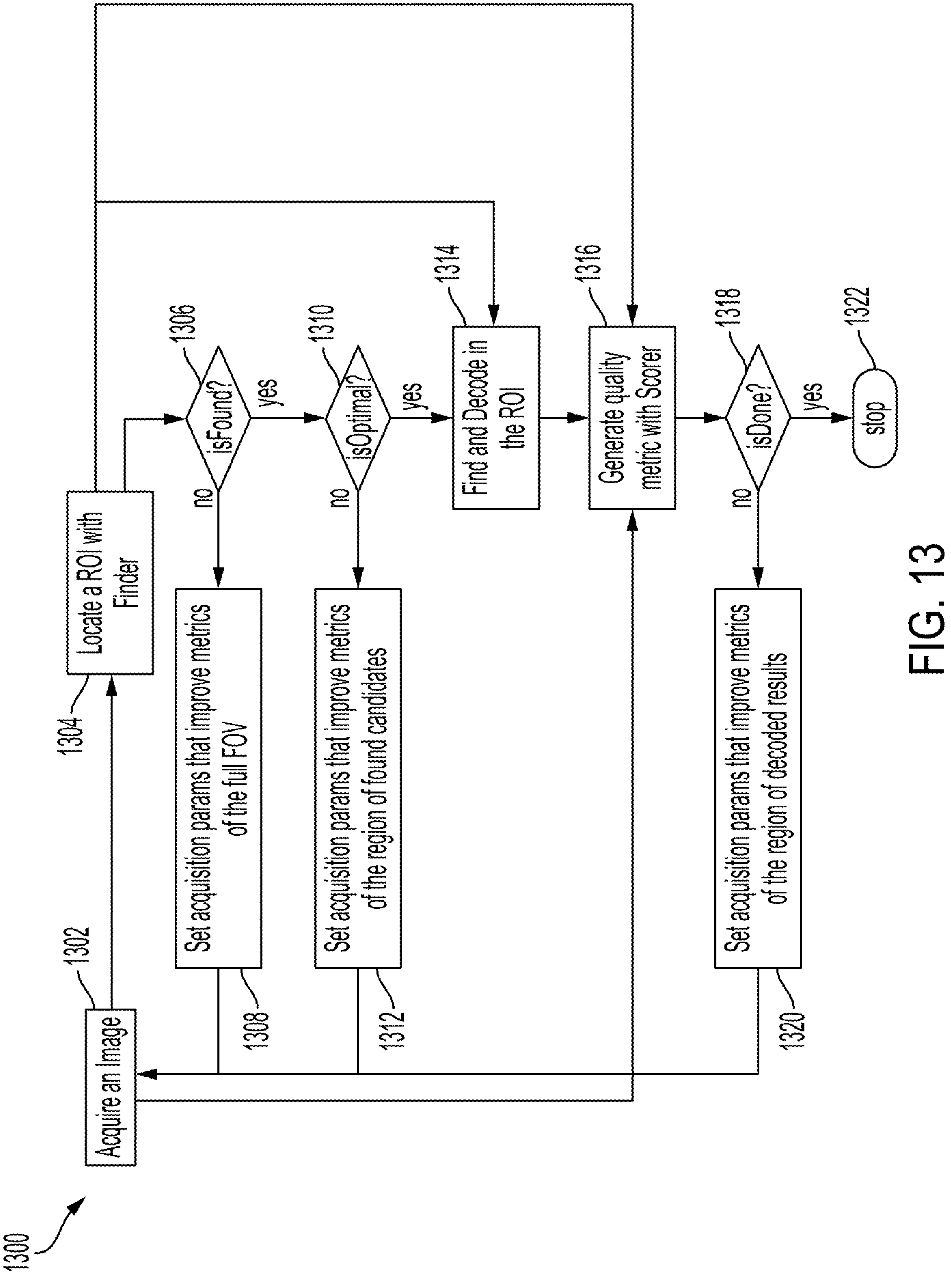
FIG. 13 is a flow chart illustrating a third method for processing a symbol, according to some embodiments.

In some embodiments, machine vision techniques described herein can be used for determining the appropriate device attribute settings. FIG. 13 shows such a method 1300 for processing a symbol. The method 1300 can start with step 1302 to acquire an image with, for example, the imaging device 302 associated with a set of attributes (which can be referred to as acquisition parameters). At step 1304, the method 1300 can locate a ROI with finder 400. At step 1306, the method 1300 can determine if a ROI is found by finder 400. If a ROI is not found at step 1306, the method 1300 can proceed to step 1308 to set acquisition parameters that improve the metrics of the full FOV of the imaging device.

If a ROI is found at step 1306, the method can proceed to step 1310 to determine whether the ROI is optimal (e.g., the likelihood that the ROI can lead to a stable and robust decode, which may include the likelihood that a symbol is completely within the ROI, the likelihood a symbol is closer to a center area of the ROI, etc.). If it is determined that the ROI is not optimal, the method 1300 can proceed to step 1312 to set acquisition parameters to optimize the ROI. If it is determined that the ROI is optimal, the method 1300 can proceed to step 1314 to find and decode a symbol in the ROI. It should be appreciated that any suitable approach can be used herein to find and decode a symbol in the ROI including, for example, approaches described herein with respect to the method 1100 and method 1200.

At step 1316, the method 500 can generate a quality metric with scorer 600. At step 1318, the method 500 can determined if the quality metric satisfies predetermined criteria. For example, it can be determined if the quality metric is above a threshold value.

If it is determined that the quality metric does not satisfy the predetermined criteria yet, the method can proceed to step 1320 to set acquisition parameters that improve decodability (e.g., metrics of the decode result of the ROI). If it is determined that the quality metric satisfies the predetermined criteria, the method 1300 can proceed to step 1322 to end the process of tuning the device attribute settings.

As illustrated, in some embodiments, the method 500 can skip steps 1306 and 1310 and proceed to step 1314 directly from step 1304. In some embodiments, the method 500 can skip steps 1306, 1310, 1314 and proceed to step 1316 directly from step 1304, in which case the scorer can extract global features 604*a* and/or region features 604*b* (but not decoder features 604*c*). In some embodiments, the method 500 can skip steps 1304, 1306, 1310, 1314 and proceed to step 1316 directly from step 1302, in which case the scorer can extract global features 604*a* (but not region features 604*b* and decoder features).

Various aspects are described in this disclosure, which include, but are not limited to, the following aspects:

1. A method for processing symbols, the method comprising: receiving, from an imaging device associated with a set of attributes, an image of an object that is at least partially within a field-of-view (FOV) of the imaging device, wherein the imaging device captured the image according to the set of attributes; in response to a presence of a symbol within the image, generating a region of interest (ROI) of the symbol; generating a quality metric for the image, wherein the quality metric indicates a measurement that the ROI of the symbol can be decoded; and adjusting the set of attributes of the imaging device based, at least in part, on the quality metric for the image.
2. The method of aspect 1, further comprising: generating, using a pre-trained deep learning model, a plurality of candidate ROIs; and selecting the ROI of the symbol from the plurality of candidate ROIs.
3. The method of aspect 2, wherein the pre-trained deep learning model was trained with a first set of training samples; and each of the training samples of the set comprises a pair of: an image that contains a symbol; and information about the symbol.
4. The method of aspect 3, wherein the information about the symbol comprises at least one of: a location of the symbol, a boundary of the symbol, pixels that comprise at least part of the symbol, an orientation of the symbol, a size of the symbol, a polarity of the symbol, a type of the symbol, a module size, a print type of the symbol, a print growth or shrinkage of the symbol, or a decodability of the symbol.
5. The method of aspect 3, wherein the first set of training samples comprise a plurality of base training samples and a plurality of augmented training samples generated from the plurality of base training samples.
6. The method of aspect 5, wherein the plurality of augmented training samples are generated from respective base training samples by at least one of: rotating, deforming elastically, flipping, blurring, changing brightness, changing contrast, overlaying random noise, shearing, or inverting polarity.
7. The method of aspect 3, wherein information about the training sample comes from a decode result of the ROI of the symbol and comprises at least one of: a location of the symbol, a boundary of the symbol, pixels that comprise at least part of the symbol, an orientation of the symbol, a size of the symbol, a polarity of the symbol, a type of the symbol, a module size, a print type of the symbol, a print growth or shrinkage, or a decodability of the symbol.
8. The method of aspect 1, wherein generating the quality metric for the image comprises: extracting a plurality of features from at least one of the image or the ROI of the symbol; and generating, using a machine learning model, the quality metric based on the plurality of features.
9. The method of aspect 8, wherein extracting the plurality of features comprises at least one of: extracting a set of global features from the image, extracting a set of regional features from the ROI of the symbol, or extracting a set of decoder features from a decode result of the ROI of the symbol.

10. The method of aspect 9, wherein the set of global features comprises at least one of: a contrast of the image, a mean of the image, a standard deviation of the image, an entropy of the image, a mean of a gradient of the image, a standard deviation of the gradient of the image, a mean of a Laplacian of the image, or a standard deviation of the Laplacian of the image.
11. The method of aspect 9, wherein the set of regional features comprises at least one of: a contrast of the ROI of the symbol, a mean of the ROI of the symbol, a standard deviation of the ROI of the symbol, an entropy of the ROI of the symbol, a mean of a gradient of the ROI of the symbol, a standard deviation of the gradient of the ROI of the symbol, a mean of a Laplacian of the ROI of the symbol, or a standard deviation of the Laplacian of the ROI of the symbol.
12. The method of aspect 9, wherein the set of decoder features comprises at least one of: a module separability, an unused error correction, a background uniformity, a fixed pattern matching, a symbol separability, a print growth or shrinkage, a grid non-uniformity, an axial non-uniformity, or a quiet zone matching.
13. The method of aspect 8, wherein the machine learning model was trained with a second set of training samples and/or features extracted from the second set of training samples, and respective target quality metrics.
14. The method of aspect 13, wherein the second set of training samples comprises images captured from a plurality of scenes in which the symbol is presented within a field-of-view of a camera; for each of the plurality of scenes, respective images are captured by changing attributes of an imaging formation system; and each scene of the plurality of scenes comprises an object and a symbol viewed by the camera from a viewpoint.
15. The method of aspect 13, wherein the second set of training samples comprises images synthesized by simulating the set of attributes of the imaging device on a set of pre-selected images of a plurality of scenes.
16. The method of aspect 15, wherein simulating the set of attributes of the imaging device comprises at least one of: blurring, applying noise, applying gamma correction, or applying image filtering.
17. The method of aspect 14, wherein the attributes of the imaging formation system form a space where each point within the space corresponds to an image captured with respective attributes of a scene of the plurality of scenes.
18. The method of aspect 14, wherein for each scene of the plurality of scenes, the respective target quality metrics of training samples of the scene are generated based on individual relative positions within a space spanned by the attributes of the imaging formation system.
19. The method of aspect 18, wherein the respective target quality metrics of the training samples of the scene are generated by: computing decode results of images of the scene captured by varying the attributes of the imaging formation system; selecting, based at least in part on the decode results, a combination of attributes from the attributes of the imaging formation system; and generating, based at least in part on a distance from a point within the space spanned by the attributes of the imaging formation system that corresponds to the selected combination of attributes, the respective target quality metrics of the training samples of the scene.
20. The method of aspect 19, wherein the selected combination of attributes have a single most desirable point which represents the attribute of the imaging formation system best suited for the scene.
21. The method of aspect 19, wherein the target quality metrics of the training images from different scenes are generated independently.
22. The method of aspect 1, comprising receiving a second image of the object from the imaging device captured according to the adjusted set of attributes.
23. The method of aspect 1, comprising determining whether the generated quality metric for the image satisfies predetermined criteria before adjusting the set of attributes of the imaging device.
24. The method of aspect 23, comprising: when it is determined that the quality metric for the image does not satisfy the predetermined criteria, proceeding with adjusting the set of attributes of the imaging device based, at least in part, on quality metric for the image; and when it is determined that the quality metric for the image satisfies the predetermined criteria, stopping adjusting the set of attributes of the imaging device.
25. The method of aspect 1, wherein the set of attributes comprises at least one of: focus, gain factor, exposure, status of light banks, polarization, image filtering, or high dynamic range (HDR).
26. The method of aspect 1, wherein the symbols comprise at least one of: a linear barcode, a stacked barcode, a postal code, or a 2D symbol.
27. A system comprising at least one processor configured to perform one or more operations in any of aspects 1-26.
28. The system of aspect 27, wherein the one or more operations described herein run in parallel on respective processors of the at least one processor.
29. The system of aspect 27 or aspect 28, wherein each of the at least one processor is a CPU, NPU, GPU, or TPU.
30. A non-transitory computer readable medium comprising program instructions that, when executed, cause at least one processor to perform one or more operations in any of aspects 1-26.

Having thus described several aspects of several embodiments of a machine vision system and method of operating the machine vision system, it is to be appreciated that various alterations, modifications, and improvements will readily occur to those skilled in the art. Such alterations, modifications, and improvements are intended to be part of this disclosure, and are intended to be within the spirit and scope of the invention. While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

Further, though some advantages of the present disclosure may be indicated, it should be appreciated that not every embodiment of the disclosure will include every described advantage. Some embodiments may not implement any features described as advantageous. Accordingly, the foregoing description and drawings are by way of example only.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

Also, the technology described may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be understood that the above-described acts of the methods described herein can be executed or performed in any order or sequence not limited to the order and sequence shown and described. Also, some of the above acts of the methods described herein can be executed or performed substantially simultaneously where appropriate or in parallel to reduce latency and processing times.

All definitions, as defined and used, should be understood to control over dictionary definitions, definitions in documents incorporated by reference, and/or ordinary meanings of the defined terms.

The indefinite articles "a" and "an," as used in the specification and in the claims, unless clearly indicated to the contrary, should be understood to mean "at least one."

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method for processing symbols, the method comprising:

receiving, from an imaging device associated with a set of attributes, an image of an object that is at least partially within a field-of-view (FOV) of the imaging device, wherein the imaging device captured the image according to the set of attributes;

in response to a presence of a symbol within the image, generating a region of interest (ROI) of the symbol;

generating, using a machine learning model, a quality metric for the image, wherein the quality metric indicates a measurement that the ROI of the symbol can be decoded; and adjusting the set of attributes of the imaging device based, at least in part, on the quality metric for the image.

2. The method of claim 1, further comprising:

generating, using a pre-trained deep learning model, a plurality of candidate ROIs; and selecting the ROI of the symbol from the plurality of candidate ROIs.

3. The method of claim 1, wherein generating the quality metric for the image comprises:

extracting a plurality of features from at least one of the image or the ROI of the symbol; and generating, using the machine learning model, the quality metric based on the plurality of features.

4. The method of claim 3, wherein extracting the plurality of features comprises at least one of:

extracting a set of global features from the image, extracting a set of regional features from the ROI of the symbol, or extracting a set of decoder features from a decode result of the ROI of the symbol.

5. The method of claim 4, wherein the set of global features comprises at least one of:

a contrast of the image, a mean of the image, a standard deviation of the image, an entropy of the image, a mean of a gradient of the image, a standard deviation of the gradient of the image, a mean of a Laplacian of the image, or a standard deviation of the Laplacian of the image.

6. The method of claim 4, wherein the set of regional features comprises at least one of:

a contrast of the ROI of the symbol, a mean of the ROI of the symbol, a standard deviation of the ROI of the symbol, an entropy of the ROI of the symbol, a mean of a gradient of the ROI of the symbol, a standard deviation of the gradient of the ROI of the symbol, a mean of a Laplacian of the ROI of the symbol, or a standard deviation of the Laplacian of the ROI of the symbol.

7. The method of claim 4, wherein the set of decoder features comprises at least one of a module separability, an unused error correction, a background uniformity, a fixed pattern matching, a symbol separability, a print growth or shrinkage, a grid non-uniformity, an axial non-uniformity, or a quiet zone matching.

8. The method of claim 1, comprising:

receiving a second image of the object from the imaging device captured according to the adjusted set of attributes.

9. The method of claim 1, comprising:

determining whether the generated quality metric for the image satisfies predetermined criteria before adjusting the set of attributes of the imaging device.

10. The method of claim 9, comprising:

when it is determined that the quality metric for the image does not satisfy the predetermined criteria, proceeding with adjusting the set of attributes of the imaging device based, at least in part, on quality metric for the image; and when it is determined that the quality metric for the image satisfies the predetermined criteria, stopping adjusting the set of attributes of the imaging device.

11. The method of claim 1, wherein the set of attributes comprises at least one of:

focus, gain factor, exposure, status of light banks, polarization, image filtering, or high dynamic range (HDR).

12. A system comprising:

an imaging device associated with a set of attributes and configured to capture images according to the set of attributes; and at least one processor configured to execute computer executable instructions, wherein the computer executable instructions comprise instructions for:

receiving, from the imaging device, an image of an object that is at least partially within a field-of-view (FOV) of the imaging device;

in response to a presence of a symbol within the image, generating a region of interest (ROI) of the symbol;

generating, using a machine learning model, a quality metric for the image, wherein the quality metric indicates a measurement that the ROI of the symbol can be decoded; and adjusting the set of attributes of the imaging device based, at least in part, on the quality metric for the image.

13. The system of claim 12, wherein:

one or more steps of the instructions run in parallel on respective processors of the at least one processor.

14. The system of claim 12, wherein each of the at least one processor is a CPU, NPU, GPU, or TPU.

15. The system of claim 12, wherein the computer executable instructions further comprise instructions for:

generating, using a pre-trained deep learning model, a plurality of candidate ROIs; and selecting the ROI of the symbol from the plurality of candidate ROIs.

16. The system of claim 12, wherein generating the quality metric for the image comprises:

extracting a plurality of features from at least one of the image or the ROI of the symbol; and generating, using the machine learning model, the quality metric based on the plurality of features.

17. The system of claim 16, wherein extracting the plurality of features comprises at least one of:

extracting a set of global features from the image, extracting a set of regional features from the ROI of the symbol, or extracting a set of decoder features from a decode result of the ROI of the symbol.

18. The system of claim 12, wherein:

the set of attributes comprises at least one of: focus, gain factor, exposure, status of light banks, polarization, image filtering, or high dynamic range (HDR); and the computer executable instructions comprise instructions for receiving a second image of the object from the imaging device captured according to the adjusted set of attributes.

19. The system of claim 12, wherein the computer executable instructions comprise instructions for:

determining whether the generated quality metric for the image satisfies predetermined criteria before adjusting the set of attributes of the imaging device;

when it is determined that the quality metric for the image does not satisfy the predetermined criteria, proceeding with adjusting the set of attributes of the imaging device based, at least in part, on quality metric for the image; and when it is determined that the quality metric for the image satisfies the predetermined criteria, stopping adjusting the set of attributes of the imaging device.

20. A non-transitory computer readable medium storing computer executable instructions configured to, when executed by at least one processor, cause the at least one processor to:

receive, from an imaging device associated with a set of attributes, an image of an object that is at least partially within a field-of-view (FOV) of the imaging device, wherein the imaging device captured the image according to the set of attributes;

in response to a presence of a symbol within the image, generate a region of interest (ROI) of the symbol;

generate, using a machine learning model, a quality metric for the image, wherein the quality metric indicates a measurement that the ROI of the symbol can be decoded; and adjust the set of attributes of the imaging device based, at least in part, on the quality metric for the image.

* * * * *